US008347556B2

(12) United States Patent
Stelmaszek et al.

(10) Patent No.: US 8,347,556 B2
(45) Date of Patent: Jan. 8, 2013

(54) MULTI-VIEW STADIUM SEATING

(75) Inventors: Thomas R. Stelmaszek, Chicago, IL (US); Shin Takeda, Chicago, IL (US)

(73) Assignee: Thomas R. Stelmaszek, Chicago, IL (US)

( * ) Notice: Subject to any disclaimer, the term of this patent is extended or adjusted under 35 U.S.C. 154(b) by 306 days.

(21) Appl. No.: 12/334,147

(22) Filed: Dec. 12, 2008

(65) Prior Publication Data

US 2010/0146869 A1 Jun. 17, 2010

(51) Int. Cl.
*E04H 3/12* (2006.01)
(52) U.S. Cl. .................. 52/9; 52/8; 472/43; 104/53
(58) Field of Classification Search ............ 52/6, 8, 52/9, 10; 472/43, 57, 59, 60; 297/240, 241, 297/242, 249, 257; 296/64; 104/53
See application file for complete search history.

(56) References Cited

U.S. PATENT DOCUMENTS

| 151,240 | A | * | 5/1874 | Murch | 280/79 |
| 919,868 | A | * | 4/1909 | Hulberg | 296/17 |
| 973,105 | A | * | 10/1910 | Chamberlain | 104/64 |
| 1,150,679 | A | * | 8/1915 | Jones et al. | 105/340 |
| 1,217,174 | A | * | 2/1917 | Hedley et al. | 105/340 |
| 1,350,601 | A | * | 8/1920 | Fuller | 296/178 |
| 1,365,984 | A | * | 1/1921 | Guild | 104/25 |
| 1,433,547 | A | * | 10/1922 | Hadden | 52/9 |
| 1,593,587 | A | * | 7/1926 | Miller | 104/28 |
| 1,754,465 | A | * | 4/1930 | Hansen | 296/64 |
| 1,937,090 | A | * | 11/1933 | Lundberg | 472/38 |
| 2,014,996 | A | * | 9/1935 | Watson | 296/64 |
| 2,046,859 | A | * | 7/1936 | Weiss et al. | 296/64 |
| 2,146,631 | A | * | 2/1939 | Kish | 472/85 |
| 2,348,841 | A | * | 5/1944 | Oswald | 352/132 |
| 3,557,712 | A | * | 1/1971 | Milenkovic | 410/4 |
| 3,752,531 | A | * | 8/1973 | Jones | 296/64 |
| 3,873,085 | A | * | 3/1975 | Nakamura | 472/136 |
| 3,975,869 | A | | 8/1976 | Bouton | |
| 4,512,257 | A | * | 4/1985 | Loisel | 104/53 |

(Continued)

FOREIGN PATENT DOCUMENTS

JP 02061266 A * 3/1990

OTHER PUBLICATIONS

Minor League Baseball, Blair County Ballpark, accessed Jun. 1, 2011: http://web.minorleaguebaseball.com/team1/page.jsp?ymd=20101102&content_id=15957002&vkey=team1_t452&fext=.jsp&sid=t452.*

(Continued)

*Primary Examiner* — Robert Canfield
*Assistant Examiner* — Brent W Herring
(74) *Attorney, Agent, or Firm* — K&L Gates LLP

(57) ABSTRACT

A spectator venue having a performance area and spectator area is disclosed. The spectator area is generally divided into to portions, a stationary seating area and a dynamic seating area, both of which overlook the performance area. In the performance area, a spectator event occurs, such as a sports game or music concert. In the dynamic seating area, a plurality of seats are provided on a series of dynamic seating platforms. The dynamic seating platforms move along a track to various viewing locations during the course of the spectator event to provide multiple vantage points of the performance area from each seat. The distance and timing of movement of the dynamic seating platforms is based on various criteria, including occurrences during the spectator event.

17 Claims, 8 Drawing Sheets

U.S. PATENT DOCUMENTS

| | | | | |
|---|---|---|---|---|
| 4,879,849 | A * | 11/1989 | Hollingsworth et al. | 52/10 |
| 5,333,257 | A | 7/1994 | Merrill et al. | |
| 5,360,365 | A | 11/1994 | Evans | |
| 5,403,238 | A * | 4/1995 | Baxter et al. | 472/43 |
| 5,746,028 | A | 5/1998 | DiBenedetto | |
| 5,765,314 | A * | 6/1998 | Giglio et al. | 52/7 |
| 5,800,272 | A * | 9/1998 | Pons | 472/85 |
| 5,921,032 | A | 7/1999 | Labinski | |
| 6,182,576 | B1 | 2/2001 | Svensson | |
| 6,287,211 | B1 * | 9/2001 | Bolliger et al. | 472/43 |
| 6,401,628 | B1 | 6/2002 | Sebata et al. | |
| 6,415,556 | B1 | 7/2002 | Silberman et al. | |
| 6,478,371 | B1 * | 11/2002 | Clarke | 297/188.11 |
| 6,715,425 | B1 * | 4/2004 | Dore | 104/53 |
| 6,796,908 | B2 * | 9/2004 | Weston | 472/43 |
| 6,983,701 | B2 | 1/2006 | Thornton et al. | |
| 7,073,858 | B2 * | 7/2006 | Fisher et al. | 297/232 |
| 7,107,724 | B2 | 9/2006 | Suprina et al. | |
| 7,149,549 | B1 | 12/2006 | Ortiz et al. | |
| 7,404,361 | B2 | 7/2008 | Nast | |
| 7,784,405 | B2 * | 8/2010 | Rose et al. | 104/20 |
| 2003/0177707 | A1 | 9/2003 | Suprina et al. | |
| 2007/0188611 | A1 | 8/2007 | Carter | |
| 2007/0293289 | A1 | 12/2007 | Loeb | |
| 2008/0294299 | A1 | 11/2008 | Amsterdam et al. | |
| 2009/0019785 | A1 * | 1/2009 | Figueras Mitjans | 52/10 |
| 2010/0139176 | A1 * | 6/2010 | Flueck et al. | 52/9 |

OTHER PUBLICATIONS

Ballparks of the Minor Leagues, Blair County Ballpark, accessed Jun. 1, 2011: http://www.littleballparks.com/Stadium/2002/Altoona/Altoona.htm.*

Ultimate Rollercoaster, Skyliner, accessed Jun. 1, 2011: http://www.ultimaterollercoaster.com/coasters/yellowpages/coasters/skyliner_lakemont.shtml.*

The Picci Carousel in Piazza della Republica as recorded by Karen's Italian Adventure, Oct. 26, 2007; http://karensitalianadventure.blogspot.com/2007/10/carousel.html.*

The Picci Carousel in Piazza della Republica, enlarged photo, as recorded by Karen's Italian Adventure, Oct. 26, 2007; http://4.bp.blogspot.com/_5BiD6xjYw1E/RyJNCeW2Mrl/AAAAAAAAA9k/gvbf1mZj0ls/s1600-h/CIMG1534.JPG.*

Indianapolis Motor Speedway Tickets: Seating Chart; Sep. 24, 2004; <http://web.archive.org/web/20040924085250/http://www.tickco.com/Race_Tracks/Indiana...>.*

* cited by examiner

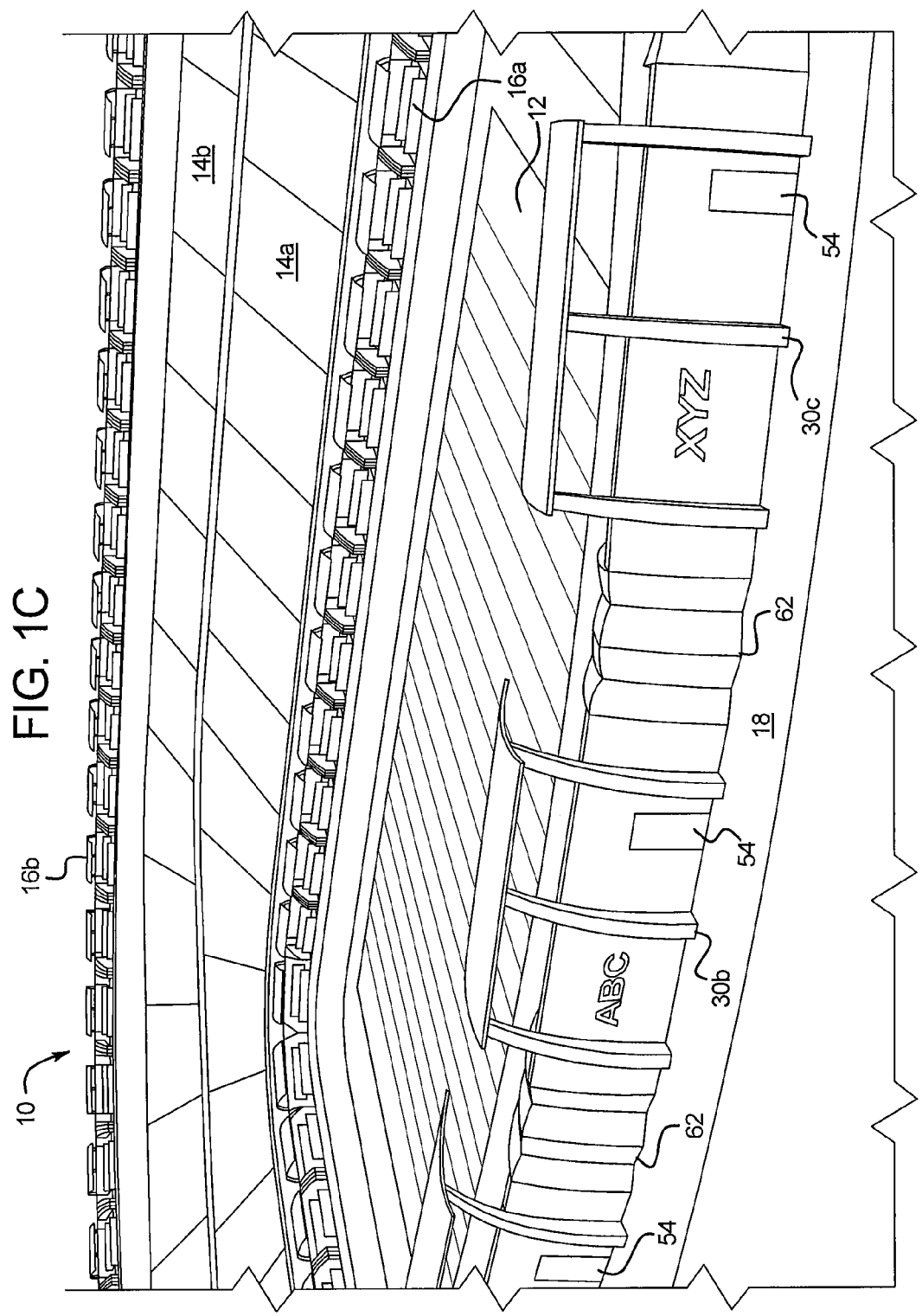

MULTI-VIEW STADIUM SEATING

BACKGROUND

The popularity of spectator sports has increased substantially in recent years, and in particular, fan attendance at sporting events has risen dramatically. For instance, data from the U.S. Census Bureau shows that from 1990 to 2006 attendance rose approximately 40% in Major League Baseball, 66% in the National Hockey League, and 26% in the National Football League. During this growth in fan interest, revenue for the four major professional sports leagues has similarly grown. For example, gross revenue for Major League Baseball was approximately $1.5 billion in the mid-90's and rose to $6 billion in 2007. Revenues were reported in 2007 for the National Football League at approximately $6.5 billion, the National Basketball Association at $3.6 billion, and the National Hockey League at $2.3 billion.

Recent stadium renovations and new stadium projects have incorporated various features to attract fans as well as increase revenues for operators. Features such as luxury suites and patio areas provide fans with non-traditional experiences and provide operators with streams of revenue in addition to those coming from conventional seating, such as bleachers and fixed seats. Luxury suites, often referred to as skyboxes, are typically private areas overlooking a performance area that may provide conventional seating as well as other amenities, such as bars, televisions, lounge areas and catered food. These suites are often leased by corporations on an annual basis and provide a significant revenue stream for sports teams and venue operators. Patio areas are often public areas that offer spectators picnic tables or tables and chairs for enjoying food and beverages while watching an event. For additional revenue, these patio areas may require ticketed entry, be associated with a particular concessionary, or even be rented for large parties.

Stadiums have also included other features designed to attract more fans and increase revenue, such as Ferris wheels, conference rooms, or modular seating sections that may be moved to accommodate different sports.

Even with the above-mentioned newly implemented features, a need continuously exists to add enjoyment and excitement to spectator viewing and in particular to provide spectators with additional seating options.

SUMMARY

One aspect of the present disclosure is to provide a spectator venue having seats with vantage points that change throughout the duration of a spectator event.

In one embodiment, a stadium for football or other sport is provided with seating areas that surround the field, including a stationary seating area and a dynamic seating area. The dynamic seating area includes a plurality of dynamic seating platforms that are linked in series and that are each provided with a plurality of seats. The dynamic seating platforms in one embodiment move along a track or rail to various positions around the track and thus around the field. Each dynamic seat thereby provides its occupant with multiple vantage points of the football field during the course of a single game. Movement of the dynamic seating platforms may occur in a multitude of patterns and take into account many considerations. For example, in one embodiment, the seating platforms move ninety degrees around the field after each quarter (for American football) and provide preferred spectators with seating positions at the fifty yard line and each end zone. In another embodiment, the seating platforms move fifty feet or other suitable distance during each television timeout. Other considerations may be taken into account when determining movement patterns, such as possession of the football, spectator vote and the weather.

Each dynamic seating platform may provide additional amenities to its occupants. Televisions and sound systems may be provided that broadcast the present game, other games or other commentary or music. Heating or cooling mechanisms and overhead covers may also be provided to protect all occupants of the dynamic seating platform from inclement weather. Additionally, each seat may offer special features, such as added cushioning, position adjustments, cup holders, tray tables and/or individual heaters.

As will become apparent to those of skill in the art, any spectator arena or other venue having seating areas that generally surround a performance area may be provided with a series of dynamic seating platforms that circulate around the performance area. Other than football, sports such as soccer, basketball, hockey and auto-racing include rectangular or oval playing areas that lend themselves well to an oval track or rail about which the dynamic seating platforms can run smoothly.

It is also contemplated to provide a combination of straight and radiused sections of track or rail that can conform to varying shapes of baseball fields. The dynamic seating platforms are not limited to sports arenas and may also be used with other types of spectator events, such as concerts and theatrical events.

The seating platforms may be linked together for movement or be separated and staggered along the track or rail. When linked, one or more of the platforms may perform the duty of being an engine for the remainder of platforms. When not linked, each platform can be driven separately. The separately driven platforms may be provided with buffers, such as air bellows, at one or more ends to cushion any unintentional or expected impact between the platforms. Various embodiments for driving the dynamic seating platforms are described in detail below including magnetic levitation, conventional electrical rail and wheeled cars driven electrically or via a combustion engine.

The dynamic seating platforms can have any of the amenities found today in stationary skyboxes, such as onboard food and drinks, and perhaps even a restroom or powder room. The platforms have doors that open to a mezzanine that also affords access to food, beverages, restrooms, concessions, etc. The platform can also display static or dynamic advertising as a source of additional revenue.

It is accordingly an advantage of the present disclosure to provide a dynamic seating system that increases enjoyment and excitement at spectator events.

It is another advantage of the present, disclosure to provide a dynamic seating system that generates additional revenue for sports teams, stadium owners, municipalities, etc.

It is a further advantage of the present disclosure to provide a dynamic seating system that generates marketing and advertising opportunities.

Additional features and advantages are described herein, and will be apparent from the following Detailed Description and the figures.

BRIEF DESCRIPTION OF THE FIGURES

FIGS. 1A to 1C are overhead and perspective views of a spectator venue including the multi-view seating system of the present disclosure.

DETAILED DESCRIPTION

Figure 1A:
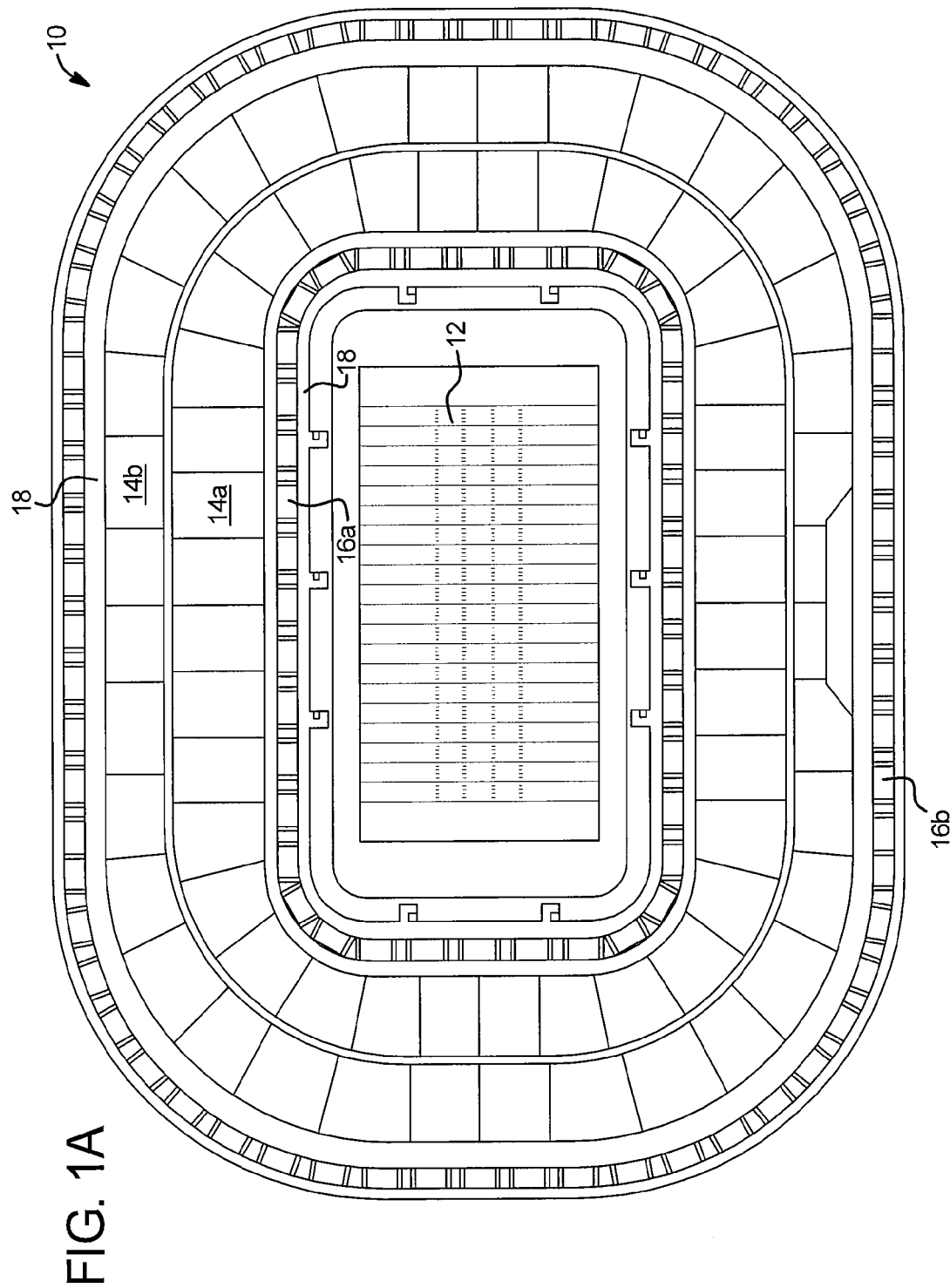

Referring now to FIGS. 1A, 1B, 1C, 2, 3, 4 and 5, in accordance with one embodiment of the present disclosure, a spectator venue 10 (also called system 10) includes a performance area 12 and a spectator area, which is divided into a stationary seating area 14 and a dynamic seating area 16. In the performance area 12, a spectator event occurs, such as playing of a sports game or singing by a musician. The stationary seating area 14 (including seating areas 14a and 14b) and the dynamic seating area 16 (including dynamic seating areas 16a and 16b) provide seating that overlooks the performance area 12, such that spectators occupying the seating areas can watch the spectator event as it occurs in the performance area 12. The stationary seating area 14 includes conventional seats, which provide spectators fixed vantage points overlooking the performance area 12. The conventional seating located in the stationary seating area 14 may include bleachers, fixed chairs, patio areas, and/or luxury suites. The dynamic seating area 16 includes movable seating, which provides spectators with multiple vantage points overlooking the performance area 12 throughout the course of a spectator event.

In one embodiment the spectator venue 10 is a dedicated outdoor football stadium, wherein the performance area 12 includes a football field on which football games are played. Other types of spectator venues 10 are also contemplated, including, but not limited to: stadiums and arenas configured to accommodate different types of spectator events, such as sports games and concerts; stadiums and arenas dedicated to sports other than football, such as baseball, soccer, basketball, auto-racing and hockey; stadiums and arenas configured to accommodate multiple types of sports, such as baseball and football or basketball and hockey; and, indoor stadiums or arenas having retractable, fixed, or inflatable dome roofs. The present disclosure further contemplates that the performance area 12 may include, but is not limited to, a playing or activity field or area for any of the above-listed venues 10, each of which may be permanently or temporarily established in the performance area 12.

In one embodiment, the dynamic seating area 16 includes a fixed surface 18, track or rail 20 and at least one dynamic seating platform 30. The dynamic seating area 16, fixed surface 18, and the track 20 generally surround the performance area 12, such that the track 20 runs continuously in a loop. The track 20 and the at least one dynamic seating platform 30 are configured such that the dynamic seating platform 30 moves in a full loop around the performance area 12 on the track 20. Additionally, a plurality of dynamic seating platforms 30 may be arranged in series and move simultaneously on the track 20. It is contemplated to move platforms 30 along track 20 in either a single directional mode or in a dual directional mode. Alternatively, the dynamic seating area 16, fixed surface 18, and/or the track 20 do not, or only partially, surround the performance area 12. Here, the one or more platform 30 moves in a back and forth manner.

Figure 1B:
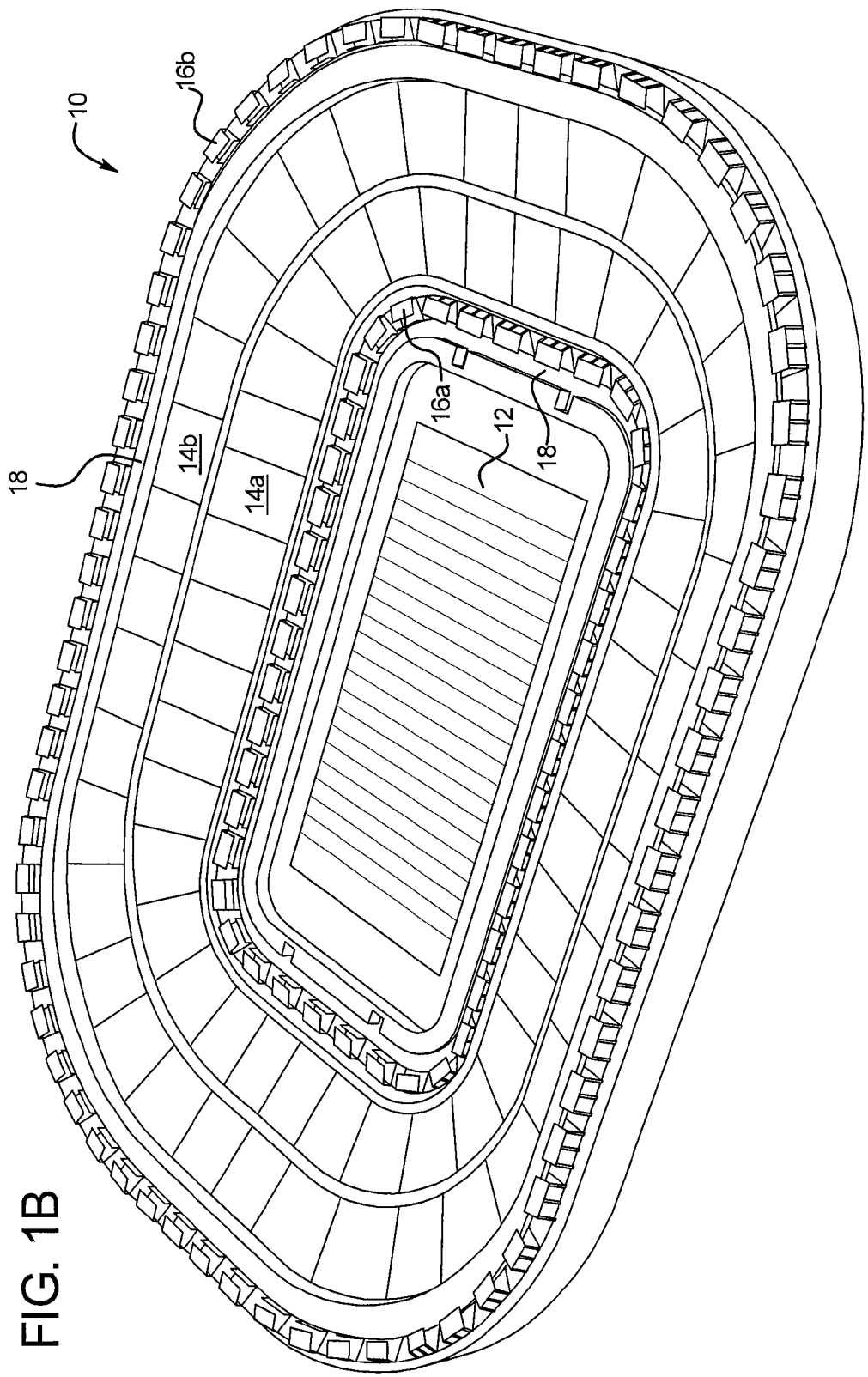
Figure 2:
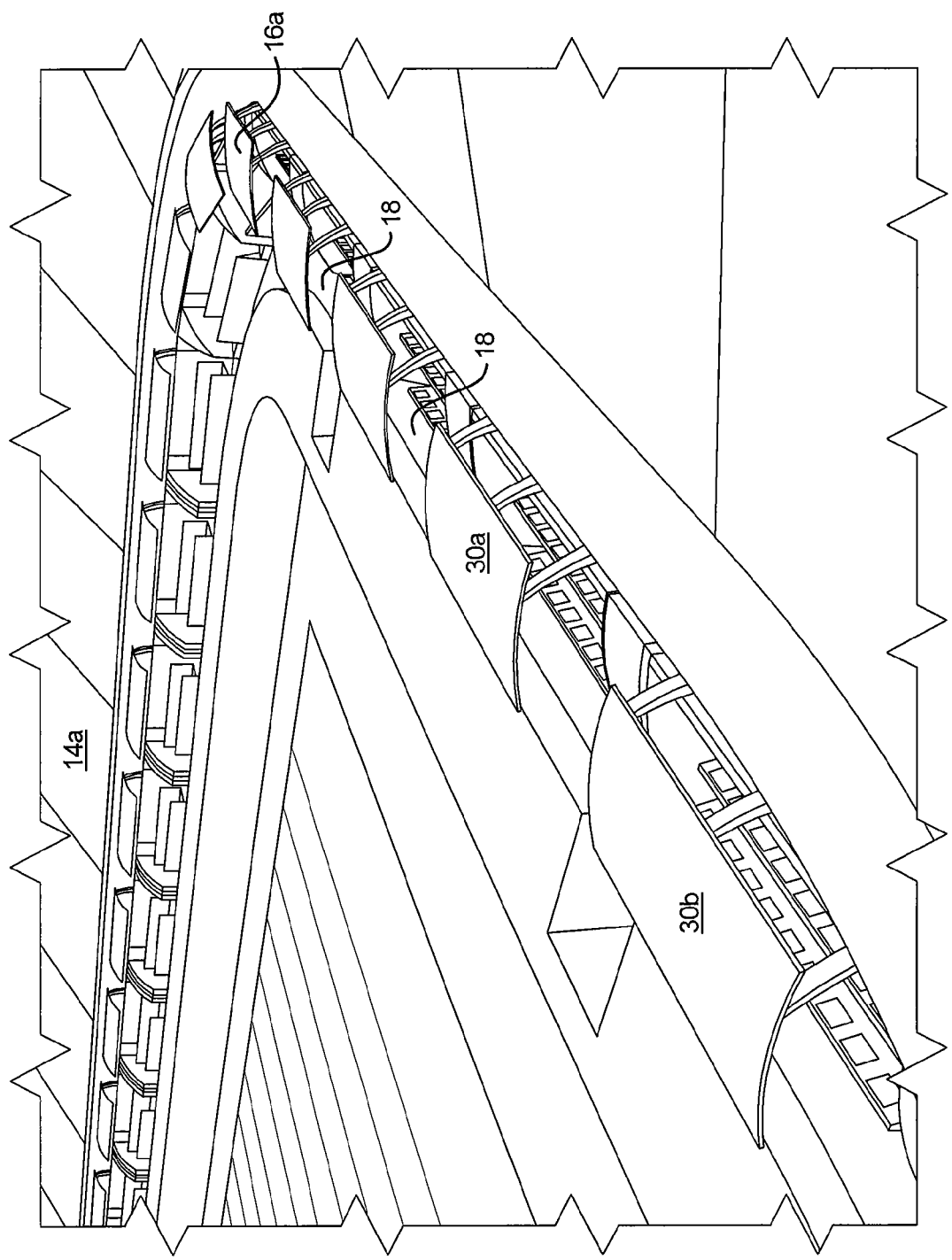
FIG. 2 is a perspective view of a spectator venue including the multi-view seating system of the present disclosure.
Figure 3:
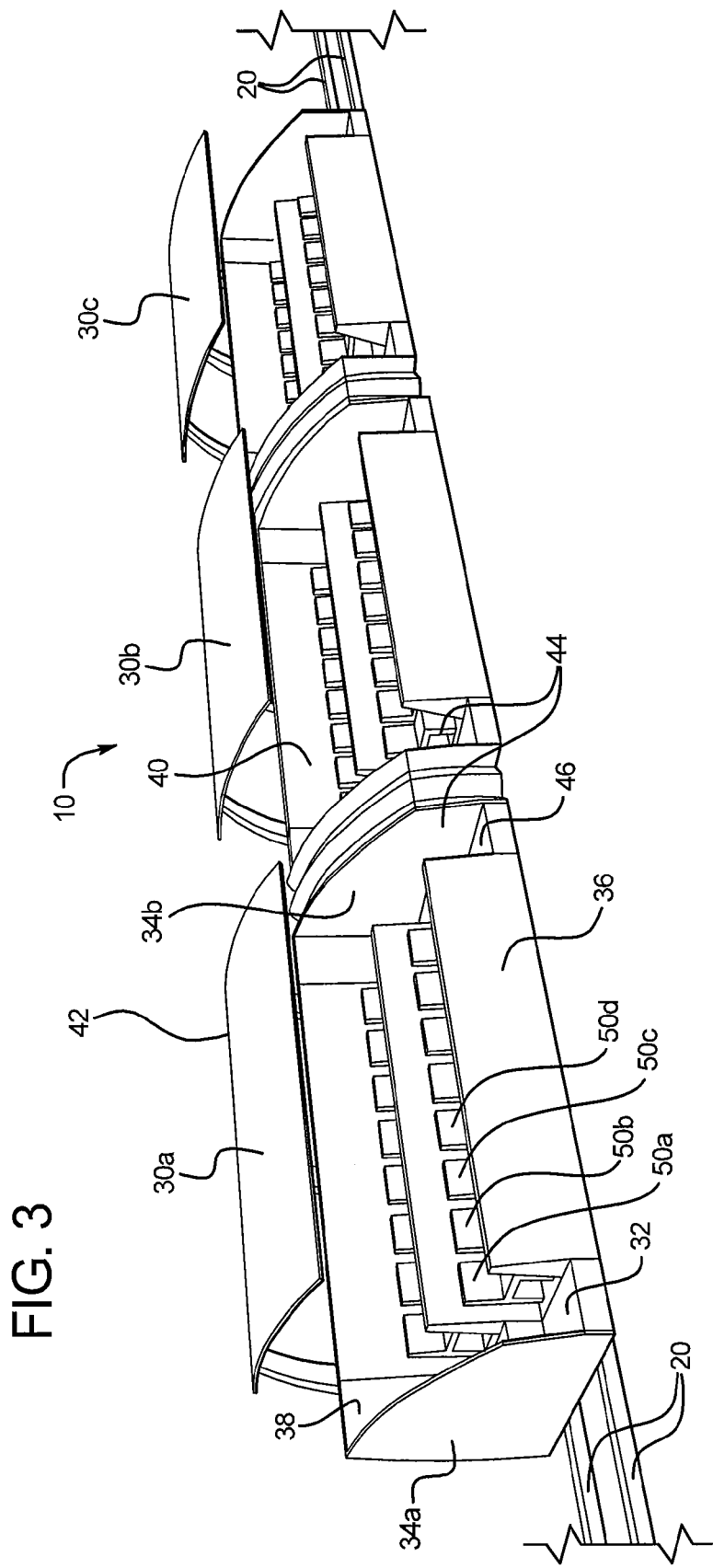
FIG. 3 is a perspective view of multiple dynamic seating platforms of the present disclosure.

As seen in FIGS. 1A, 1B and 2, fixed surface 18 can be located in front of track 20 and platforms 30. Fixed surface 18 is generally level, is made from concrete, and is located below the track 20 and the at least one dynamic seating platform 30. In other contemplated embodiments, the fixed surface 18 is not generally level, instead having a consistent slope or varying contours. The fixed surface 18 may also be made of other generally rigid materials including, but not limited to, metal, wood, other naturally occurring materials, synthetic materials, and any combination thereof. Fixed surface 18 located in front of platforms 30 my be provided with small concession stands that do not inhibit the view of the fans sitting in platforms 30.

As seen in FIG. 1C, the fixed surface 18 is located alternatively behind track 20 and/or the at least one dynamic seating platform 30. Patrons can exit the rear of the platforms 30 via doors 54 when the platforms are not moving and walk onto the surface or mezzanine 18 and proceed to a concession area, restroom or other viewing area. The outer rear wall of the platform 30 is suitably marked, so that the patron knows which platform 30 to reenter. Fixed surface 18 may be further alternatively split so as to be provided in front and back of platforms 30.

Figure 4:
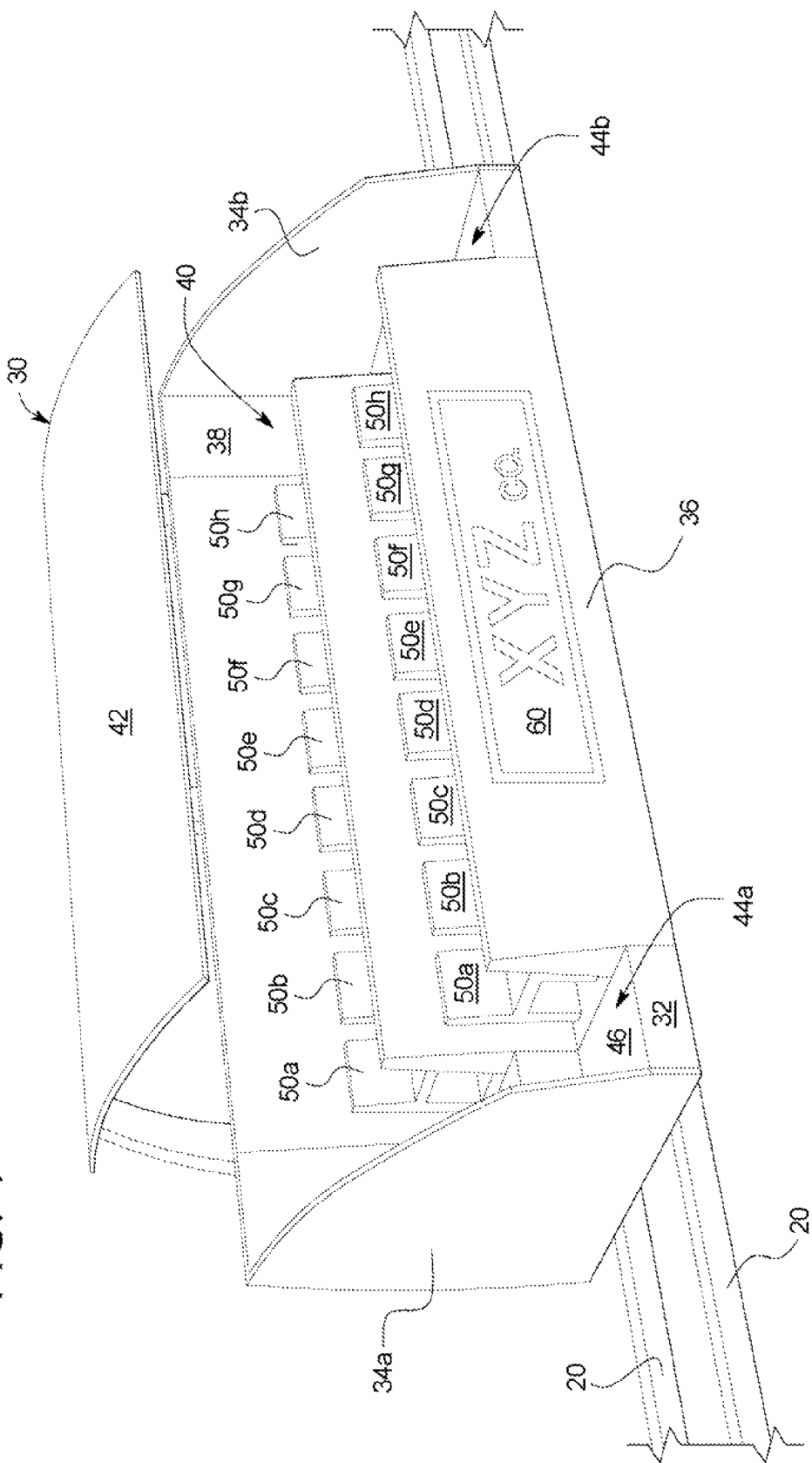
FIG. 4 is a perspective view of one embodiment of a dynamic seating platform of the present disclosure shown from the outside.
Figure 5:
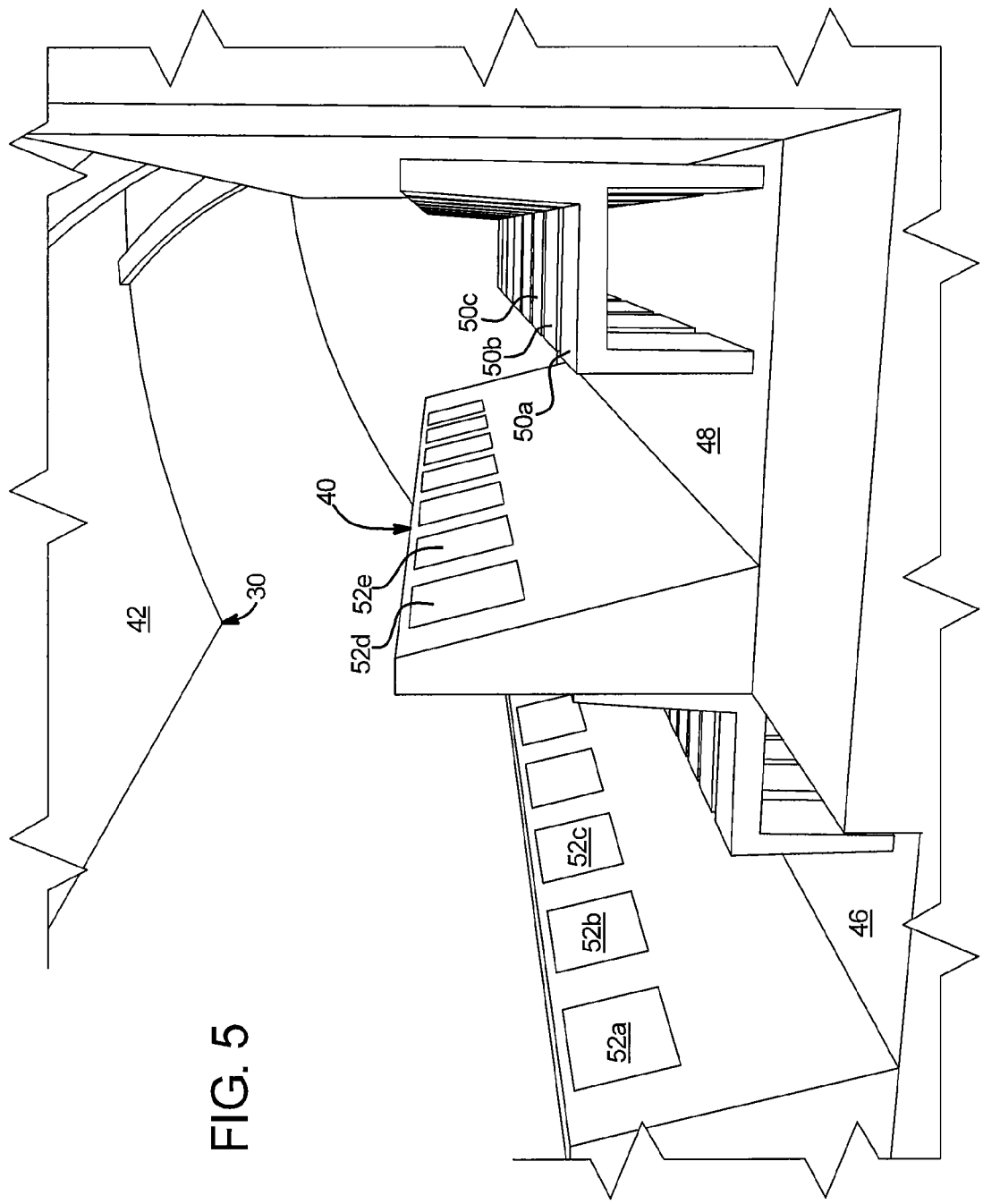
FIG. 5 is a perspective view of one embodiment of a dynamic seating platform of the present disclosure shown from the inside.

As illustrated in FIGS. 4 and 5, the dynamic seating platform 30 of system 10 includes a floor 32, side walls 349a and 34b, a front wall 36, a back wall 38 and a roof 42. Floor 32 is generally level, and the side walls 34a and 34b, front wall 36, and back wall 38 extend upward from the floor or base to define an inner seating area 40. The roof 42 extends from the back wall 38 toward the front wall 36 so as to generally cover the inner seating area 40. The rear wall 38 extends fully between the side walls 34a and 34b and connects thereto. The front wall 36 extends partially between the side walls 34a and 34b to provide spectator access points 44a and 44b at the front of the platform seating area 40 when fixed surface 18 is located in front of platforms 30. In an alternative embodiment of FIG. 1C, one or more door 54 (FIG. 1C) is provided in back wall 38 to allow access to fixed surface 18 when located behind platform 30.

Fixed surface 18 can further alternatively include first and elevational second levels, where the first level is at a higher elevation than the second level. The first and second levels of surface 18 correspond to an elevationally changing continuous track 20, such that when the dynamic seating platform 30 moves along the track 20, the dynamic seating platform 30 moves to different elevations corresponding to the first and second levels of fixed area 18.

In one embodiment, the track 20 is rigidly attached to the fixed surface 18. The track 20 is arranged below the at least one dynamic seating platform 30 and supports the at least one dynamic seating platform 30. The track 20 can include two conventional steel rails running generally parallel to each other, similar to those used by railroads or elevated rail cars used for example at airports. The rails are removably attached to the fixed surface 18, such that portions of the track 20 may be removed and/or replaced as required. Other contemplated configurations of the track 20 include, but are not limited to: arranging the track 20 above the at least one dynamic seating platform 30 (FIG. 6); providing a single rail with side bearing support; providing tubular rails, such as those used on modern roller coasters; providing rails composed of materials other than steel, such as aluminum, other metals, synthetic materials, naturally occurring materials, or a combination thereof;

recessing the rails of the track 20 into the fixed surface 18; and permanently affixing the rails of the track 20 to the fixed surface 18.

Dynamic seating platform 30, in general, is moved along the track 20 by a drive system, including a power source and a drive source. The power source is configured to provide power to the drive source, and the drive source is configured to move the dynamic seating platform 30 along the track 20. In one embodiment, the drive system is contained entirely within one or more dynamic seating platform 30. The power source is a battery that provides electricity to the drive source, and the drive source includes at least one electric motor configured to move the dynamic seating platform 30 along the track 20 by driving wheels or rollers of the platforms 30 that engage conventional or tubular rails of the track 20 or by driving a wheel that engages the fixed surface 18.

In another embodiment, the drive system is partially contained within the dynamic seating platform 30. The dynamic seating platform 30 contains the drive source, but the power source is external to the dynamic seating platform 30. The power source is a conventional electricity source, such as mains power provided at the stadium. Electricity is transferred from the power source to the drive source by using an electrified channel running generally parallel to the track 20 and a conductor located on the dynamic seating platform 30 that is electrically connected to the drive source. The conductor engages the electrified channel, so as to transfer electricity between the power source and drive source while the dynamic seating platform 30 is moving along the track 20. Alternatives to the electrified channel are also contemplated and include, but are not limited to, conductive rails and contact wires.

In yet another embodiment, the drive system is generally external to the dynamic seating platform 30; that is, the power source and drive source are both external to the dynamic seating platform 30. The power source is a conventional electricity source, and the drive source is a conveyer system, including at least one electric motor and a drive line. The drive line can be a belt that runs generally parallel to the track 20, and the dynamic seating platform 30 is configured to fixedly, or releasably, engage the driveline. The power source provides electricity to the electric motor, which is configured to pull the driveline which, in turn, moves the dynamic seating platform 30 along the track 20. Alternatives to the belt include, but are not limited to, other continuous, linear, and flexible objects such as chains or cables. Further, the drive source may instead be an engine powered by fossil fuels and combustion engines capable of pulling the drive line.

In still another embodiment, a series of dynamic seating platforms 30 is mechanically interconnected and only one, or a select portion, of the dynamic seating platforms 30 is/are driven directly by the drive source of the drive system. As the drive source moves the one or more selected dynamic seating platform 30, the other dynamic seating platforms 30 move along the track 20 via their being coupled to the powered platform(s) 30. FIG. 1C shows that platforms 30 (referring collectively to platforms 30a to 30c) may be coupled via bellows 62, e.g., air or foam, that absorb the energy of one platform running into (pushing) or pulling away from another platform 30.

In one embodiment, platforms 30 are moved along track 20 via magnetic levitation, for example, as described in U.S. Pat. No. 6,983,701, entitled "Suspending, Guiding and Propelling Vehicles Using Magnetic Forces", and U.S. Pat. No. 7,404,361, entitled "Vehicle Adapted To Move Along a Rail", the entire contents of each of which are incorporated herein by reference.

In another embodiment, the track 20 includes conventional rails and the dynamic seating platform 30 includes wheels configured to engage and roll on the conventional rails of the track 20, for example, as described in U.S. Pat. No. 6,401,628, entitled "Railway Vehicle", the entire contents of which are incorporated herein by reference. In a further embodiment, the track 20 includes a singular and/or tubular rail and the dynamic seating platform 30 includes rollers configured to engage and roll along the single and/or tubular rail or the track 20, for example, as described in U.S. Pat. No. 6,182,576, entitled "Monorail System", the entire contents of which are incorporated herein by reference.

In still another embodiment, the track 20 includes a solid, generally-level surface; the dynamic seating platform 30 includes a solid, generally-level surface; the dynamic seating platform 30 includes conventional tires and wheel configured to engage, turn and roll along a guided path of the solid, generally-level surface. Other contemplated embodiments include other configurations or combinations of the described configurations suitable for the dynamic seating platform 30 to move along the track 20.

Figure 6:
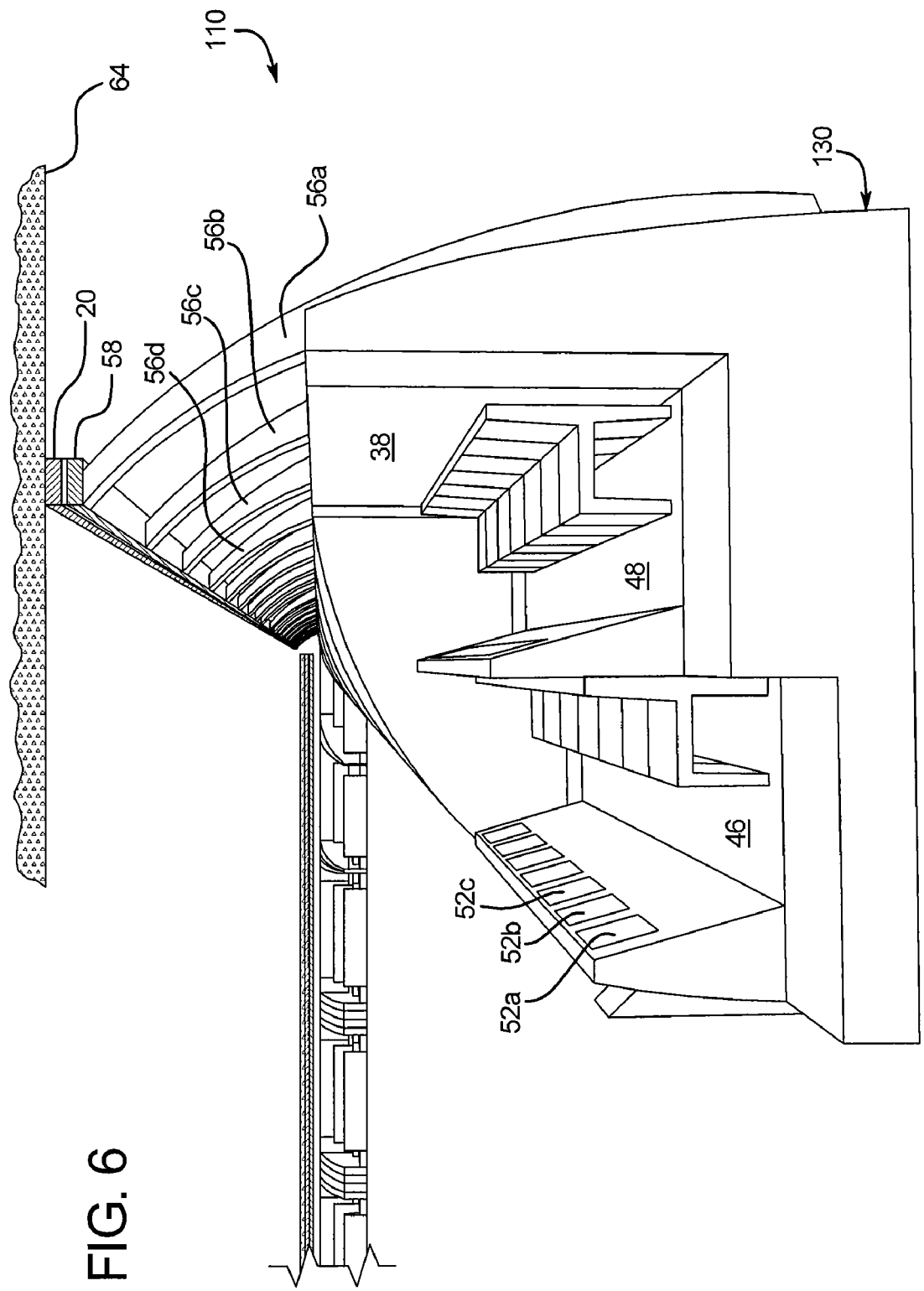
FIG. 6 is a perspective view of multiple dynamic seating platforms having an alternative arrangement in which the platforms are supported and moved along a track located above the platform.

As seen in an alternative embodiment in FIG. 6, alternative venue or system 110 disposes track 20 above alternative platforms 130. Track 20 may itself be sized to support the weight of platform 130. Alternatively, supports may be provided in front of, behind or below platforms 30 to support the platforms as they travel along a track or rail disposed above the platform. Track 20 is in turn connected to an overhanging, e.g., concrete slab 64, which is built as part of alternative venue 110. In FIG. 6, each platform 130 includes struts 56a to 56d that extend up from rear wall 38 of the platform. Struts 56a to 56d each attach to a support beam 58, which is slidingly fastened to rail 20. Beam 58 and thus platform 30 are moved along rail 20 via one of the methods described herein, e.g., via electrically driven roller or wheel contact.

As seen in FIGS. 4, 5 and 6, within platform seating area 40 of the dynamic seating platforms 30 and 130 are a first row 46 and a second row 48 that is located upward and rearward of the first row 46. A plurality of seats 50a to 50h are located on both the first row 46 and the second row 48 and are oriented to generally to face the performance area 12.

Seating area 40 may have a single row or three or more rows as desired, each row having a desired number of seat. Other contemplated configurations for the dynamic seating platform include, but are not limited to: having fewer walls, no walls, railings, or a combination thereof; having no roof or a roof that is collapsible, removable, or clear, or any combination thereof; having access points 44 located elsewhere, such as the rear or side of the dynamic seating platform 30; providing doors (e.g., doors 54) or gates at the access points 44; and, providing multiple rows of seats at one elevation. Seating area 40 can also have an open area for people to stand and mingle.

In one embodiment, the dynamic seating platform 30 and 130 provides its spectators with other amenities. These features include, but are not limited to: televisions or video screens 52c to 52h, a retractable roof 42 for overhead cover, extra leg room, heating, air conditioning, a sound system(s), a refrigerator(s) and bars stocked with choices of food and beverages, cup holders and tray tables, adjustable cushioned seats, onboard bathrooms, and service staff. Additionally, spectators occupying the dynamic seating platforms 30 may be provided privileged access to restricted areas within the spectator venue 10 or 110 including, but not limited to, private bathrooms, bars, restaurants, e.g., located along a rearward facing fixed area 18, and parking.

The dynamic seating platform 30 and 130 may provide its spectators with a warning signal that the platform is moving or will soon move, such as an audible, visual, or tactile indicator, or combination thereof. It is also contemplated to provide such signal outside of seating platform 30, discernable to stationary area 18, to inform a patron returning to the platform that it is about to move.

The track 20 and dynamic seating platform 30 and 130 are configured such that the dynamic seating platform 30 and 130 moves along the track 20 and circulates around the performance area 12. As the dynamic seating platform 30 and 130 moves along the track 20, spectators occupying each seat 50*a* to 50*h* of each row 46 and 48 are given multiple vantage points overlooking the performance area 12. As the dynamic seating platform 30 moves along the track 20, spectators occupying the plurality of seats 50 are provided multiple vantage points overlooking the performance area 12. The dynamic seating platform 30 and 130 moves to various viewing locations on the track 20 around the performance area 12 based on the occurrence of predetermined criteria and/or in response to events occurring during the spectator event.

In one embodiment, the dynamic seating platform 30 and 130 rests at a first viewing location and, during each television timeout of a football game, moves a set distance, e.g., fifty feet before coming to rest at a second viewing location. During subsequent television timeouts, the process is repeated, and the dynamic seating platform 30 and 130 again moves the set distance to a new viewing location. The dynamic seating platforms 30 and 130 can also be programmed to move to viewing locations defined in other manners, such as, move at changing distances along the track 20; move at degrees relative to a center of the performance area as opposed to a distance 12; move a distance relative to a particular location on the performance area 12, such as a particular yard line or line of scrimmage on a football field, basket on a basketball court, base on a baseball field, or stage position; and, move based on weather, such as relative to a location of the sun.

The dynamic seating platform 30 and 130 may also move based on other criteria including, but not limited to: change of possession in a football game; the end of a period, inning, or round in a sports game; the beginning of an intermission, or end of a song during a concert; requests by spectators occupying the plurality of seats 50 on the dynamic seating platform 30; and, any suitable combination of the aforementioned or other criteria. Additionally, the dynamic seating platform 30 and 130 may also be prevented from moving based on other criteria, including, but not limited to: spectators not being seated; spectators standing in the access points 44; gates or doors to the access points 44 or rear wall 38 being open; ongoing play of a sports game; requests by spectators; override by a stadium operator; security concerns; and, any suitable combination of the aforementioned or other criteria.

In one embodiment, the spectator venue 10 includes a plurality of dynamic seating platforms 30 and 130 arranged in series. Each dynamic seating platform 30 and 130 is assigned a priority level, and those dynamic seating platforms 30 and 130 having the highest priority levels move between preferred viewing locations at preferred times. Preferred viewing locations include, but are not limited to: the 50 yard line on the football field; an end zone of the football field in which a particular team may score; a half-court line on a basketball court; positions in closest proximity to a stage located in the performance area 12; and positions requested by spectators occupying the dynamic seating platform 30 and 130 with highest priority. The basis for preferred times for moving the dynamic seating platforms 30 and 130 includes, but is not limited to: change of possession during a football game; changing of weather; and requests by spectators occupying the dynamic seating platform 30 and 130 with highest priority.

By providing dynamic seating areas 16 contemplated in the present disclosure, stadium or arena owners and operators are provided with additional revenue streams as compared to move conventional spectator venues. These additional revenue streams include, but are not limited to; ticket premiums for seats within the dynamic seating area 16; ticket premiums for higher priority dynamic seating platforms 30 within the dynamic seating area 16; advertising on the televisions 20 located on the dynamic seating platform 30, which is directed toward spectators occupying the dynamic seating platform 30; and, advertising located on the dynamic seating platform 30 and 130, such as on a fixed or video display 60 (FIG. 4), which is directed toward other spectators in the spectator venue 10 or towards one or more cameras for television spectators.

In various embodiments, each dynamic seating platform 30 and 130 is owned or leased, in whole or in part by a corporation or other legal entity. That entity's name or logo may then be shown on display 60, e.g., XYZ Co. in FIG. 4. The advertising supplies an additional source of revenue for the team, stadium or other interested party. Platforms 30 and 130 may display fixed or dynamic advertising for any desirable purpose, which may be independent of the ownership of the platform, e.g., general produce and services advertising.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A spectator venue at a sporting arena comprising:
 a performance area selected from the group consisting of:
  a football field, a baseball field, a soccer field, a basketball court, a hockey rink and an auto-raceway; and
 a spectator area including:
  a stationary seating area including a plurality of stationary seats residing in at least two elevationally different rows,
  a track residing on a fixed surface, the fixed surface located elevationally above the stationary seating area, and
  a plurality of seats disposed on at least one dynamic seating platform, the plurality of dynamic seating platform seats facing a direction that is generally transverse to that of the track for viewing the performance area,
  wherein the at least one dynamic seating platform is configured to move along the track at least one time during a spectator event to provide multiple vantage points overlooking the performance area from the plurality of dynamic seating platform seats.

2. The spectator venue of claim 1, wherein the dynamic seating platforms are interconnected in series, and the dynamic seating platforms are thereby configured to move simultaneously.

3. The spectator venue of claim 1, wherein the track is located on the fixed surface above the at least one dynamic seating platform.

4. The spectator venue of claim 1, wherein the track is located on the fixed surface below the at least one dynamic seating platform.

5. The spectator venue of claim 1, wherein the at least one dynamic seating platform includes at least one of a bathroom, a food and beverage area.

6. The spectator venue of claim 1, which is configured such that the at least one dynamic seating platform can be moved at predetermined time intervals.

7. The spectator venue of claim 1, which is configured such that the at least one dynamic seating platform can be moved a predetermined distance.

8. The spectator venue of claim 1, which is configured such that the at least one dynamic seating platform can be moved based on an event that occurs during the spectator event.

9. The spectator venue of claim 1, which is further configured to notify spectators when the at least one dynamic seating platform will move or is moving.

10. The spectator venue of claim 1, wherein advertising is displayed on the at least one dynamic seating platform.

11. The spectator venue of claim 1, wherein the seats disposed on the at least one dynamic seating platform are associated with a higher ticket price than the stationary seats provided at the stationary seating area of the spectator area.

12. A spectator venue at a sporting arena comprising:
a performance area selected from the group consisting of:
a football field, a baseball field, a soccer field, a basketball court, a hockey rink and an auto-raceway;
a spectator area including:
a stationary seating area including a plurality of stationary seats residing in at least two elevationally different rows,
a track extending around at least a majority of a perimeter of the performance area and residing on a fixed surface located elevationally above the stationary seating area, and
a plurality of seats disposed on a series of dynamic seating platforms supported by the track, wherein the series of dynamic seating platforms are moveable simultaneously along the track at least one time during a spectator event to provide multiple vantage points overlooking the performance area from the plurality of dynamic seating platform seats; and
wherein the series of dynamic seating platforms move based on the occurrence of a predetermined criterion.

13. The spectator venue of claim 12, wherein the predetermined criterion includes a stoppage of a performance in the performance area.

14. The spectator venue of claim 12, wherein the predetermined criterion includes a predetermined time interval.

15. The spectator venue of claim 12, wherein the predetermined criterion includes an event occurring in a performance in the performance area.

16. The spectator venue of claim 12, wherein at least one of the dynamic seating platforms is configured to allow access onto and off of the seating platform during a performance in the performance area.

17. The spectator venue of claim 12, wherein one of the dynamic seating platforms is configured to move at least one of the other dynamic seating platforms.

* * * * *